United States Patent
Sumitomo et al.

(10) Patent No.: US 8,431,632 B2
(45) Date of Patent: Apr. 30, 2013

(54) CRAYON

(75) Inventors: Kotaro Sumitomo, Sijonawate (JP); Masamitsu Takahashi, Sijonawate (JP); Hidetoshi Fukuo, Yao (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 12/668,294

(22) PCT Filed: Jul. 9, 2008

(86) PCT No.: PCT/JP2008/062369
§ 371 (c)(1),
(2), (4) Date: Jun. 15, 2010

(87) PCT Pub. No.: WO2009/008437
PCT Pub. Date: Jan. 15, 2009

(65) Prior Publication Data
US 2010/0273914 A1    Oct. 28, 2010

(30) Foreign Application Priority Data

Jul. 10, 2007  (JP) .................................. 2007-180828

(51) Int. Cl.
*C09D 13/00* (2006.01)
(52) U.S. Cl.
USPC ........................................................ 523/164
(58) Field of Classification Search .................... 523/164
See application file for complete search history.

(56) References Cited

U.S. PATENT DOCUMENTS 6,203,910 B1 * 3/2001 Fukuo et al. .................. 428/413

FOREIGN PATENT DOCUMENTS

| JP | 54-23619 | B2 | 8/1979 |
| JP | 55-41716 | B2 | 10/1980 |
| JP | 11-209679 | A | 8/1999 |
| JP | 2005-015732 | A | 1/2005 |
| JP | 2006-274246 | A | 10/2006 |

OTHER PUBLICATIONS

A. H. Tullo, ACS C&EN, 2005, 83(46), 29-31.*
K. Nuthall, ICIS News Feb. 10, 2004 (http://www.icis.com/Articles/2004/02/10/557100/eu-scientific-body-says-atbc-safe-as-plasticiser-in.html).*
International Search Report of PCT/JP2008/062369, dated Sep. 30, 2008.

* cited by examiner

*Primary Examiner* — Vu A Nguyen
(74) *Attorney, Agent, or Firm* — Hamre, Schumann, Mueller & Larson, P.C.

(57) ABSTRACT

The invention provides a crayon which comprises an alternative plasticizer in place of the conventional phthalate ester plasticizers and yet provides writings excellent in water resistance, the crayon comprising a colorant, a gelling agent, an organic solvent, a resin component, and a plasticizer, wherein the plasticizer is at least one selected from diisononyl adipate, acetyltributyl citrate, 1,2-cyclohexanedicarboxylic acid diisononyl, and alkylsulfonic acid phenyl ester and is contained in an amount of 1 to 20% by weight based on the crayon.

8 Claims, No Drawings

CRAYON

TECHNICAL FIELD

This invention relates to a crayon which provides writings excellent in water resistance.

BACKGROUND ART

A crayon containing a colorant, an organic solvent, a resin and a gelling agent as main components has been conventionally well known. As an example, a crayon obtained by dissolving or dispersing a gelling agent comprising dibenzylidene sorbitol, tribenzylidene sorbitol, or a derivative thereof, a resin component and a coloring agent in an organic solvent to prepare a mixture, and then cooling and solidifying the mixture (see Patent Literatures 1 and 2).

In recent years, as safety standards of crayon have come to be severe, a crayon produced using glycol monoalkyl ethers as an organic solvent has been proposed (see Patent Literature 3), and on the other hand, a crayon with improved writing quality under severe circumstances or on any writing surfaces formed of various materials has been proposed (see Patent Literature 4).

Such conventional crayons contain a phthalate ester plasticizer such as dibutyl phthalate or butylbenzyl phthalate so that the crayon has a suitable hardness, that is, so that the crayon has a good feeling when used, as well as the crayon can provide water resistant writings (see Patent Literature 2). However, it has recently come to be feared that the phthalate ester plasticizers might be toxic, and while there is a trend that the use thereof is being regulated in various products, an alternative plasticizer to be incorporated in crayons for instead of the conventional phthalate ester plasticizers is called so that the resulting crayon can provide water resistant writings.

Patent Literature 1: Japanese Patent Publication No. 54-23619B
Patent Literature 2: Japanese Patent Publication No. 55-41716B
Patent Literature 3: Japanese Patent Application Laid-Open No. 11-209679A
Patent Literature 4: Japanese Patent Application Laid-Open No. 2006-274246A

DISCLOSURE OF THE INVENTION

Technical Problems to be Solved

This invention has been completed in order to solve the problems involved in the conventional crayons as mentioned above. Therefore, it is an object of the invention to provide a crayon which comprises an alternative plasticizer in place of the conventional phthalate ester plasticizers and yet provides writings excellent in water resistance.

Means to Solve the Problems

The invention provides a crayon comprising a colorant, a gelling agent, an organic solvent, a resin component, and a plasticizer, wherein the plasticizer is at least one selected from diisononyl adipate, acetyltributyl citrate, 1,2-cyclohexanedicarboxylic acid diisononyl, and alkylsulfonic acid phenyl ester and is contained in an amount of 1 to 20% by weight based on the crayon.

Effects of the Invention

The crayon of the invention comprises an alternative plasticizer in place of the conventional phthalate ester plasticizers, and yet it can provide writings even better in water resistance than a crayon comprising the conventional phthalate ester plasticizers.

BEST MODE OF CARRYING OUT THE INVENTION

The crayon of the invention comprises a colorant, a gelling agent, an organic solvent, a resin component, and a plasticizer, wherein the plasticizer is at least one selected from diisononyl adipate, acetyltributyl citrate, 1,2-cyclohexanedicarboxylic acid diisononyl, and alkylsulfonic acid phenyl ester and is contained in an amount of 1 to 20% by weight based on the weight of the crayon.

The organic solvent used in the crayon of the invention is not specifically limited, and at least one selected from the group consisting of alcohols, glycols, glycol ethers, and glycol ether esters is preferably used. Specific examples of such preferable organic solvents include: alcohols, such as methanol, ethanol, isopropyl alcohol, 3-methyl-3-methoxybutanol, and 3-methoxy-1-butanol; glycols, such as ethylene glycol, propylene glycol, diethylene glycol, and dipropylene glycol; glycol ethers, such as methyl ether, ethyl ether, propyl ether, butyl ether, and phenyl ether of the above-mentioned glycols; and glycol ether esters such as acetates of the above-mentioned glycol ethers.

Among the above-mentioned organic solvents, at least one selected from the group consisting of 3-methyl-3-methoxybutanol, ethylene glycol monobutyl ether, propylene glycol monobutyl ether, and dipropylene glycol monomethyl ether is particularly preferably used.

The amount of the organic solvent in the crayon of the invention is suitably determined depending on the other components, such as a colorant. The amount of the organic solvent is usually in the range from 20 to 80% by weight, and preferably in the range from 30 to 65% by weight, based on the weight of crayon. When the amount of the organic solvent is excessively large, there is a possibility that it becomes difficult to integrally gel the necessary components when a crayon is produced. On the other hand, when the amount of the organic solvent is excessively small, it becomes difficult to dissolve the necessary components therein, resulting in a possibility that a uniform gel cannot be formed when a crayon is produced.

The gelling agent is a component for integrating the necessary components into solid. As such a gelling agent, at least one selected from the group consisting of dibenzylidene sorbitol, tribenzylidene sorbitol and derivatives thereof is preferably used.

Examples of derivatives of dibenzylidene sorbitol include compounds in which a benzene nucleus in a benzylidene group of dibenzylidene sorbitol is substituted with an alkyl group having 1 to 3 carbon atoms or a halogen atom at an arbitrary position. Specific examples thereof include [di(p-methylbenzylidene)]sorbitol, [di(m-ethylbenzylidene)]sorbitol, and [di(p-chlorobenzylidene)]sorbitol.

Examples of derivatives of tribenzylidene sorbitol include compounds in which a benzene nucleus in a benzylidene group of tribenzylidene sorbitol is substituted with an alkyl group having 1 to 3 carbon atoms or a halogen atom at an arbitrary position. Specific examples thereof include [tri(p-methylbenzylidene)]sorbitol, [tri(m-ethyl-benzylidene)]sorbitol, and [tri(p-chlorobenzylidene)]sorbitol. The above-mentioned gelling agents can be used singly or in combination of two or more.

The amount of the gelling agent in the crayon of the invention is usually in the range from 2 to 20% by weight, preferably in the range from 3 to 10% by weight, based on the weight of crayon. It is not preferable to use an excessively large amount of the gelling agent because the hardness of the crayon obtained is too high, and thus the crayon has reduced colorability when writing. On the contrary, when the amount of the gelling agent is excessively small, it becomes difficult to integrally gel the necessary components in the production of crayon.

The crayon of the invention comprises a coloring agent so that it may provide writings of various colors on a writing surface. A dye may be used as a coloring agent, but a pigment is preferably used as a coloring agent. The pigment may be either organic or inorganic. Examples of the pigments used include, for example, a phthalocyanine pigment such as copper phthalocyanine blue, an indanthrene pigment, an azo pigment, a quinacridone pigment, an anthraquinone pigment, a dioxazine pigment, an indigo pigment, a thioindigo pigment, a perinone pigment, a perylene pigment, an indolenone pigment, and an azo-azomethine pigment, and, in addition thereto, titanium oxide and carbon black. Furthermore, as required, an inorganic pigment, such as iron oxide, red iron oxide, chromium oxide, calcium carbonate, clay, and talc, a fluorescent pigment, colored resin particles, a metallic flake pigment, such as aluminum powder, a so-called pearl pigment, etc., may also be used. Various extender pigments may also be used as required. However, the coloring agent usable in the invention is not limited to the above.

The amount of the coloring agent in the crayon of the invention is usually in the range of 2-50% by weight based on the weight of crayon. When the amount of the coloring agent in a crayon is less than 2% by weight, the resulting crayon may make no sufficient color development. However, when the amount of the coloring agent exceeds 50% by weight, the relative proportions of the other components other than the coloring agent are excessively low in the crayon obtained, and thus the functions of each of the components are not fully demonstrated, thereby failing to provide a crayon excellent in performance. Moreover, in the production of crayon, the viscosity of solution of mixtures of the components used as raw materials is excessively high, which makes it difficult to pour the solution into a molding container when a crayon is molded. The preferred amount of coloring agent in a crayon varies depending on the type of the coloring agent used, and is usually in the range of 3-40% by weight based on the weight of crayon.

According to the invention, the resin component has a function of integrating the components used, as well as a function as a fixing agent for writings provided on a writing surface with the crayon obtained. According to the invention, a film forming resin and an adhesive resin are preferably used in combination as the resin component.

The film forming resin is intended to increase hardness of the crayon obtained and strengthen a writing formed on a writing surface, and is not particularly limited insofar as such functions are given. In particular, polyvinyl butyral resin and cellulosic resin are preferably used.

According to the invention, polyvinyl butyral resin is specifically and preferably used because it is very effective in dispersing a pigment when a crayon is prepared. In particular, when a combination of a polyvinyl butyral resin having an average degree of polymerization of less than 350 and a polyvinyl butyral resin having an average degree of polymerization of 350 or more, there is obtained a crayon which has a moderate hardness and a good feeling when used. In the above-mentioned combination of the polyvinyl butyral resins, the proportion of the polyvinyl butyral resin having an average degree of polymerization of less than 350 is usually in the range of 20-95% by weight, and more preferably in the range of 40-80% by weight, and most preferably in the range of 50-75% by weight, and the proportion of the polyvinyl butyral resin having an average degree of polymerization of 350 or more is usually in the range of 5-80% by weight, and more preferably in the range of 20-60% by weight, and most preferably in the range of 25-50% by weight.

When the proportion of polyvinyl butyral resin having an average degree of polymerization of less than 350 exceeds 95% by weight, the resulting crayon has too small a hardness so that it collapses easily when used, and writes badly also. On the other hand, when the proportion of polyvinyl butyral resin having an average degree of polymerization of 350 or more exceeds 80% by weight, the resulting crayon has too high a hardness so that it provides a writing sticky to a writing surface and it writes badly.

As a cellulosic resin, cellulose acetate butylate, ethyl cellulose, acetyl cellulose, etc. are preferred. The film forming resin may be used singly or in combination of two or more.

On the other hand, the adhesive resin is intended to increase adhesion of writing formed with the crayon obtained to a writing surface, and is not particularly limited insofar as such functions are given. Usually ketone resin, acrylic resin, xylene resin, polyamide resin, and the like, are used. Examples of ketone resin include a condensate of cyclohexanone and formaldehyde. Examples of acrylic resin include thermoplastic polyacrylic acid ester. Examples of xylene resin include a condensate of m-xylene and formaldehyde. Examples of polyamide resin include a thermoplastic resin obtained by condensation polymerization of dimer acid and diamine or polyamine and having a molecular weight of about 4,000 to 9,000. The adhesive resins may also be used singly or in combination of two or more.

According to the invention, the weight ratio of the film forming resin to the adhesive resin is suitably determined depending on the other components. The weight ratio of the film forming resin to the adhesive resin is usually about 1:0.1 to 5, and preferably about 1:0.2 to 3. The amount of the film forming resin and the adhesive resin in total in a crayon is usually in the range of 3-40% by weight, preferably in the range of 6-35% by weight based on the weight of crayon. When the amount of the resin component is excessively large, the hardness of the crayon obtained is excessively high and hence it is poor in colorability and leveling properties. On the contrary, when the amount of the resin component is excessively small, it becomes difficult to integrally gel the necessary components in the production of crayon, and the crayon obtained has no sufficient fixability and strength.

The crayon of the invention comprises at least one plasticizer selected from diisononyl adipate, acetyltributyl citrate, 1,2-cyclohexanedicarboxylic acid diisononyl, and an alkylsulfonic acid phenyl ester in an amount of 1 to 20% by weight, preferably in an amount of 2 to 6% by weight, based on the weight of crayon so that, in cooperation with the resin component, the plasticizer may provide the resulting crayon with a moderate hardness and hence the crayon has good feeling when used, as well as the crayon provides a writing excellent in water resistance.

When the amount of the plasticizer in a crayon is less than 1% by weight based on the weight of crayon, the resulting crayon fails to provide a water resistant writing. However, when the amount of the plasticizer in a crayon is 20% by weight or more based on the weight of crayon, it becomes difficult to gel integrally the other components including the plasticizer in the production of a crayon. Moreover, the resulting crayon writes badly. According to the invention, among the plasticizers mentioned above, an alkylsulfonic acid phenyl ester is preferred since it provides a writing especially excellent in water resistance. According to the invention, MESAMOLL (registered trademark)-II (having an alkyl group of 4-17 carbon atoms) available from Lanxess is preferably used as such an alkylsulfonic acid phenyl ester.

In addition to the above-mentioned components, the crayon of the invention may comprise other components which are conventionally known as additives in a crayon, such as an anticorrosive agent, a filler, a leveling agent, a viscosity controlling agent, a structural viscosity imparting agent, and a dryness imparting agent, as required.

The hardness of the crayon obtained in this way according to the invention can be suitably adjusted depending on the type and proportion of the organic solvent, the gelling agent, the resin, etc. used, and is generally from about 5-50 kg/cm$^2$, and preferably from 7-30 kg/cm$^2$.

The crayon of the invention is not specifically limited in the method of production. Basically it can be obtained by mixing the above-mentioned components uniformly and gelling them integrally. By way of an example, a film forming resin is dissolved in a part of organic solvent used to prepare a solution, and a coloring agent is added to and dispersed in the solution using a mill, for example, to prepare a mixture. Then the rest of the organic solvent, and then an adhesive resin, a plasticizer, and a gelling agent, and so on are added to and dissolved or dispersed in the mixture. Thereafter, the resulting uniform liquid mixture is poured into a molding container having a desired shape, cooled and solidified, thereby a crayon having the desired shape is obtained. When a crayon is produced in this manner, any of the components may be dissolved while it is heated, if necessary.

The crayon of the invention comprises such an alternative plasticizer as described herein, and provides a writing excellent in water resistance. Therefore, for example, a writing provided on glass plate with the crayon of the invention does not separate from the glass plate even if the glass plate is immersed in water. Furthermore, even if the glass plate is then dried, the writing does not even separate from the glass plate. The writing is as such, and accordingly, the writing is excellent in weatherability even if it is left in rain.

EXAMPLES

The invention will be described with reference to the following examples and comparative examples, but the invention is not limited thereto. The details of solvents, plasticizers, pigments, resins and gelling agents used below are as follows.
Solvent 1: Ethylene glycol monobutyl ether
Solvent 2: Propylene glycol monobutyl ether
Solvent 3: Dipropylene glycol monomethyl ether
Plasticizer 1: Diisononyl adipate
Plasticizer 2: Acetyltributyl citrate
Plasticizer 3: 1,2-dicyclohexanedicarboxylic acid diisononyl
Plasticizer 4: Alkylsulfonic acid phenyl ester (MESAMOLL (registered trademark)-II available from Lanxess)
Plasticizer 5: Butylbenzyl phthalate
Pigment 1: Titanium oxide
Pigment 2: #30 available from Mitsubishi Chemical K.K.
Resin 1: MOWITAL B20H, polyvinyl butyral resin available from Kuraray Co., Ltd. (having an average degree of polymerization of about 300)
Resin 2: MOWITAL B30H, polyvinyl butyral resin available from Kuraray Co., Ltd. (having an average degree of polymerization of about 500)
Resin 3: Highluck 111, ketone resin available from Hitachi Chemical Co., Ltd.
Resin 4: Vrersamide 335, polyamide resin available from Henkel Hakusui K.K.

Example 1

13.02 parts by weight of polyvinyl butyral resin (MOWITAL B-20H available from Kuraray Co., Ltd.) and 8.00 parts by weight of polyvinyl butyral resin (MOWITAL B-30H available from Kuraray Co., Ltd.) were added to and dissolved in a mixed solvent composed of 26.97 parts by weight of ethylene glycol monobutyl ether and 10.85 parts by weight of propylene glycol monobutyl ether. 17.36 parts by weight of titanium oxide was added to the resulting solution and dispersed therein using a mill.

3.80 parts by weight of diisononyl adipate was added as a plasticizer to the resulting solution and the solution was heated to 130° C. 4.8 parts by weight of ketone resin (Highluck 111 available from Hitachi Chemical Co., Ltd.) and 9.0 parts by weight of polyamide resin (Versamide 335 available from Henkel Hakusui K.K.) were added to the solution while the solution was stirred, and the resulting mixture was maintained at the temperature to dissolve the ketone resin and the polyamide resin therein. Then, 6.2 parts by weight of gelling agent, dibenzylidene sorbitol (Gelol D available from New Japan Chemical Co., Ltd.) was added to the solution at the same temperature as above and dissolved therein. The raw material solution thus obtained was poured into a cylindrical molding container, cooled and solidified, and the resulting solid product or a crayon was taken out of the container.

Examples 2-8

The components shown in Table 1 were used each in an amount as shown in Table 1, and otherwise in the same manner as Example 1, crayons were obtained.

Comparative Examples 1 and 2

The components shown in Table 1 were used each in an amount as shown in Table 1, and otherwise in the same manner as Example 1, crayons were obtained.

A writing was provided on a glass plate and immersed in water to examine the water resistance of the writing in a manner as mentioned below. Furthermore, a writing was provided on a glass plate, immersed in water, taken out of the water, and then dried to examine the water resistance of the writing in a manner as mentioned below.
(Water Resistance of Writing Immersed in Water)

A glass plate was cleaned with an alcohol and dried with dry cloth to prepare a writing surface. Using each of the crayons, a straight line was written on the writing surface in a one way direction, dried for 24 hours, half of the line on the writing surface was immersed in still water for seven days, and then it was checked visually whether the line which had been immersed in still water separated from the writing surface. When the line was found not to separate at all from the writing surface, the water resistance of the writing was evaluated to be A, and when the line was found to separate from the writing surface, the water resistance of the writing was evaluated to be B. The results are shown under the item of "Immersion-in-water Method" in Table 1
(Water Resistance of Writing Immersed in Water and then Dried)

A glass plate was cleaned with an alcohol and dried with dry cloth to prepare a writing surface. The glass plate was masked so that it had a 5 cm square writing surface exposed. Using each of the crayons, a line was written on the writing surface in a one way lengthwise direction, dried for 24 hours, and then another line was written on the writing surface in a one way transverse direction, and dried for 24 hours. Then, after the whole glass plate was immersed in still water for four days, the glass plate was taken out of the water, and dried to check visually whether the line separated from the writing surface. The results are shown under the item of "Single Immersion Method" in Table 1

As mentioned above, the whole glass plate was immersed in still water for four days, taken out of the water, and dried, and then the whole glass plate was again immersed in still water for four days, taken out of the water, and dried, to check visually whether the line separated from the writing surface. The results are shown under the item of "Two Times Immersion Method" in Table 1

In the single immersion method and two times immersion method, when the line was found not to separate at all from the writing surface, the water resistance of the writing was evaluated to be A, when an indication of separation of the line from the writing surface was observed, the water resistance of the writing was evaluated to be B, and when the line was found to separate from the writing surface, the water resistance of the writing was evaluated to be C.

A writing provided by the crayon of the invention was found not to be separated from the writing surface if it was immersed in water, and was also found not to be separated from the writing surface if it was immersed in water, and then dried. The water resistance of writing is even better than a writing provided by a crayon prepared using butylbenzyl phthalate as a plasticizer. In particular, a crayon prepared using an alkylsulfonic acid phenyl ester provides a more water resistant writing than a writing provided by a crayon prepared using butylbenzyl phthalate as a plasticizer.

A crayon which contains no plasticizer provides a writing which is separated from a writing surface when it is immersed in water, or when it is immersed in water and then dried. That is, such a crayon only provides a writing poor in water resistance.

TABLE 1

| | | | Examples | | | | | | Comparative Examples | | |
|---|---|---|---|---|---|---|---|---|---|---|---|
| | | 1 | 2 | 3 | 4 | 5 | 6 | 7 | 1 | 2 | 3 |
| Composition of Crayon | | | | | | | | | | | | |
| Solvent | 1 | 27 | 27 | 27 | 27 | 27 | 27 | 12 | 27 | 12 | 27 |
| | 2 | 11 | 11 | 11 | 11 | 13 | 9 | 18 | 15 | 18 | 11 |
| | 3 | | | | | | | 21 | | 26 | |
| Plasticizer | 1 | 4 | | | | | | 5 | | | |
| | 2 | | 4 | | | | | | | | |
| | 3 | | | 4 | | | | | | | |
| | 4 | | | | 4 | 2 | 6 | | | | |
| | 5 | | | | | | | | | | 4 |
| Pigment | 1 | 17 | 17 | 17 | 17 | 17 | 17 | | 17 | | 17 |
| | 2 | | | | | | | 5 | | 5 | |
| Resin | 1 | 13 | 13 | 13 | 13 | 13 | 13 | 13 | 13 | 13 | 13 |
| | 2 | 8 | 8 | 8 | 8 | 8 | 8 | 5 | 8 | 5 | 8 |
| | 3 | 5 | 5 | 5 | 5 | 5 | 5 | 15 | 5 | 15 | 5 |
| | 4 | 9 | 9 | 9 | 9 | 9 | 9 | | 9 | | 9 |
| Gelling Agent | | 6 | 6 | 6 | 6 | 6 | 6 | 6 | 6 | 6 | 6 |
| Water Resistance of Writing | | | | | | | | | | | | |

TABLE 1-continued

| | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| Immersion-in-water Method | A | A | A | A | A | A | A | A | B | A |
| Single Immersion Method | A | A | A | A | A | A | B | C | — | A |
| Two-times Immersion Method | B | B | B | A | B | A | — | C | — | B |

The invention claimed is:

1. A crayon comprising a colorant, a gelling agent, an organic solvent, a resin component, and a plasticizer,
    wherein the plasticizer is at least one selected from the group consisting of diisononyl adipate, acetyltributyl citrate, 1,2-cyclohexanedicarboxylic acid diisononyl, and alkylsulfonic acid phenyl ester and is contained in an amount of 1 to 20% by weight of the crayon;
    wherein the resin component consists of a film forming resin and an adhesive resin, and the film forming resin is at least one selected from the group consisting of a polyvinyl butyral resin and a cellulosic resin, and the adhesive resin is at least one selected from the group consisting of a ketone resin, a xylene resin, a polyamide resin, an acrylic resin, a maleic acid resin, a terpene-phenol resin, and an alkylphenol resin, and wherein the weight ratio of the film forming resin to the adhesive resin is 1:0.1 to 1:5, and wherein the film forming resin and the adhesive resin are contained in total in the crayon in an amount of 3-40% by weight of the crayon; and
    wherein the organic solvent is at least one selected from the group consisting of ethylene glycol monobutyl ether, propylene glycol monobutyl ether, dipropylene glycol monomethyl ether, and 3-methyl-3-methoxybutanol and contained in an amount of 20-80% by weight of the crayon.

2. A crayon according to claim 1, wherein the cellulosic resin is at least one selected from the group consisting of cellulose acetate butylate, ethyl cellulose and acetyl cellulose.

3. A crayon according to claim 1, wherein the plasticizer is contained in an amount of 2 to 6% by weight of the crayon.

4. A crayon according to claim 1, wherein the resin component is contained in an amount of 6 to 35% by weight of the crayon.

5. A crayon according to claim 1, wherein the organic solvent is contained in an amount of 30-65% by weight of the crayon.

6. A crayon according to claim 1, wherein the film forming resin is a polyvinylbutyral resin.

7. A crayon according to claim 1, wherein the adhesive resin is at least one selected from the group consisting of a ketone resin and a polyamide resin.

8. A crayon according to claim 1, wherein the film forming resin is a polyvinylbutyral resin, and the adhesive resin is at least one selected from the group consisting of a ketone resin and a polyamide resin.

* * * * *